(12) United States Patent
Liang

(10) Patent No.: US 6,616,201 B1
(45) Date of Patent: Sep. 9, 2003

(54) OPEN-CLOSE DEVICE FOR SHELL COVERS EQUIPMENTS

(75) Inventor: Shun Ying Liang, Taoyuan Hsien (TW)

(73) Assignee: T-Win Sheet Metal Co., Ltd., Taoyuan Hsien (TW)

( * ) Notice: Subject to any disclaimer, the term of this patent is extended or adjusted under 35 U.S.C. 154(b) by 0 days.

(21) Appl. No.: 10/198,148

(22) Filed: Jul. 19, 2002

(30) Foreign Application Priority Data

Jul. 8, 2002 (TW) ........................................ 091210340

(51) Int. Cl.[7] .............................. E05B 73/00; E05C 3/04
(52) U.S. Cl. .............................. 292/207; 70/58; 70/169
(58) Field of Search ................................ 70/2, 58, 162, 70/169, 173; 292/207, 204, 208, 209; 312/223.2, 265.5, 265.6; 220/324

(56) References Cited

U.S. PATENT DOCUMENTS

| | | | | |
|---|---|---|---|---|
| 3,591,219 A | * | 7/1971 | Graziosi | 292/207 |
| 4,071,722 A | * | 1/1978 | Hart | 361/339 X |
| 4,536,022 A | * | 8/1985 | Giordano | 292/228 |
| 5,125,697 A | * | 6/1992 | Kahl et al. | 292/204 |
| 5,172,520 A | * | 12/1992 | Hostetler et al. | 292/207 X |
| 5,219,195 A | * | 6/1993 | Lawrence | 292/336.3 |
| 5,593,192 A | * | 1/1997 | Stuchinsky | 292/207 |
| 5,751,545 A | * | 5/1998 | Jung | 361/683 |
| 6,000,250 A | * | 12/1999 | Daoud | 70/56 |
| 6,373,692 B1 | * | 4/2002 | Cheng | 361/683 |

* cited by examiner

Primary Examiner—Lloyd A. Gall
(74) Attorney, Agent, or Firm—Troxell Law Office PLLC

(57) ABSTRACT

The present invention provides a device for opening and closing regular shell covers, especially referring to open-close device suitable for installation on the cover of a metal shell, which provides a larger tenon and a smaller tenon on the shell cover, and on the inside at the smaller tenon provides a sliding lock member, also in the shell corresponding to the position of the larger tenon provides a rotary lock member, through pressing the rotary lock member after the closing of the shell cover, and pushing the lock piece of the lock member in the smaller tenon, making the lock piece locking into the lock hole of the rotary lock member in place, reverse steps to open.

1 Claim, 3 Drawing Sheets

OPEN-CLOSE DEVICE FOR SHELL COVERS EQUIPMENTS

BACKGROUND OF THE INVENTION

Regular equipment shells whether of electric devices, computer main frame, industrial computer, or related devices, usually are provided with open-able or close-able shell covers, for reasons for safety, dust-proofing, convenience of maintenance etc., also said shell covers are provided with locking devices for opening-up the shell covers for maintenance or close-up. And the referred shell covers mostly are produced through procession in presses from metallic materials for the consideration of durability, thickness, weight, processing, shaping, waterproofing, corrosion resisting, and cost. Although, the part of locking devices for close-up of conventional shell covers of equipment shells, either was too voluminous or too complicated in structure, occupied too much space, cost more, or inconvenient in operation relatively.

Aiming at the various defects in the close-up lock of metallic shell covers of the above conventional equipment shells, accordingly, the inventor developed attentively and completed the present invention, in expectation to provide a open-close device for shell covers, suitable for various kinds of shell covers, which comprises a traversing open-close or rotary-handle open-close device suitable for shell covers. The device of the present invention provides a larger tenon and a smaller tenon on a shell cover thereof, and a sliding lock piece installed on the back side of the smaller tenon, and provides a rotary lock member inside the shell wherein corresponding to the larger tenon, with said rotary lock member extending through the larger tenon of the above shell cover, when the shell cover is closed-up to position therewith, by pressing the rotary lock member and pushing the lock piece in the smaller tenon, rendering the lock piece locking into the lock hole of the rotary lock member, to achieve a good locking positioning.

The detailed structure and function of the present invention are described with illustrations behind. The lock devices of the invention applied in various shell covers should be within the containment part of the patent scope of the invention, the patent specification and illustration of the invention are exemplified with industrial computer as description and illustration drawing thereof, which should not be limited within implementation application in the shell cover of a computer industrial, hereby set forth.

SUMMARY OF THE INVENTION

The present invention provides a device for opening and closing of a regular shell cover, especially referring to open-close device suitable for installation on the shell cover of a metal shell, which provides a larger tenon and a smaller tenon on the shell cover, and on the inside at the smaller tenon provides a sliding lock member, also in the shell corresponding to the position of larger tenon provides a rotary lock member, through pressing the rotary lock member after the closing of the shell cover, and pushing the lock piece of the lock member in the smaller tenon, making the lock piece locking into the lock hole of the rotary lock member in place, reverse steps to open.

THE DETAILED DESCRIPTION OF THE EMBODIMENT AND STRUCTURE OF THE INVENTION

Figure 1:
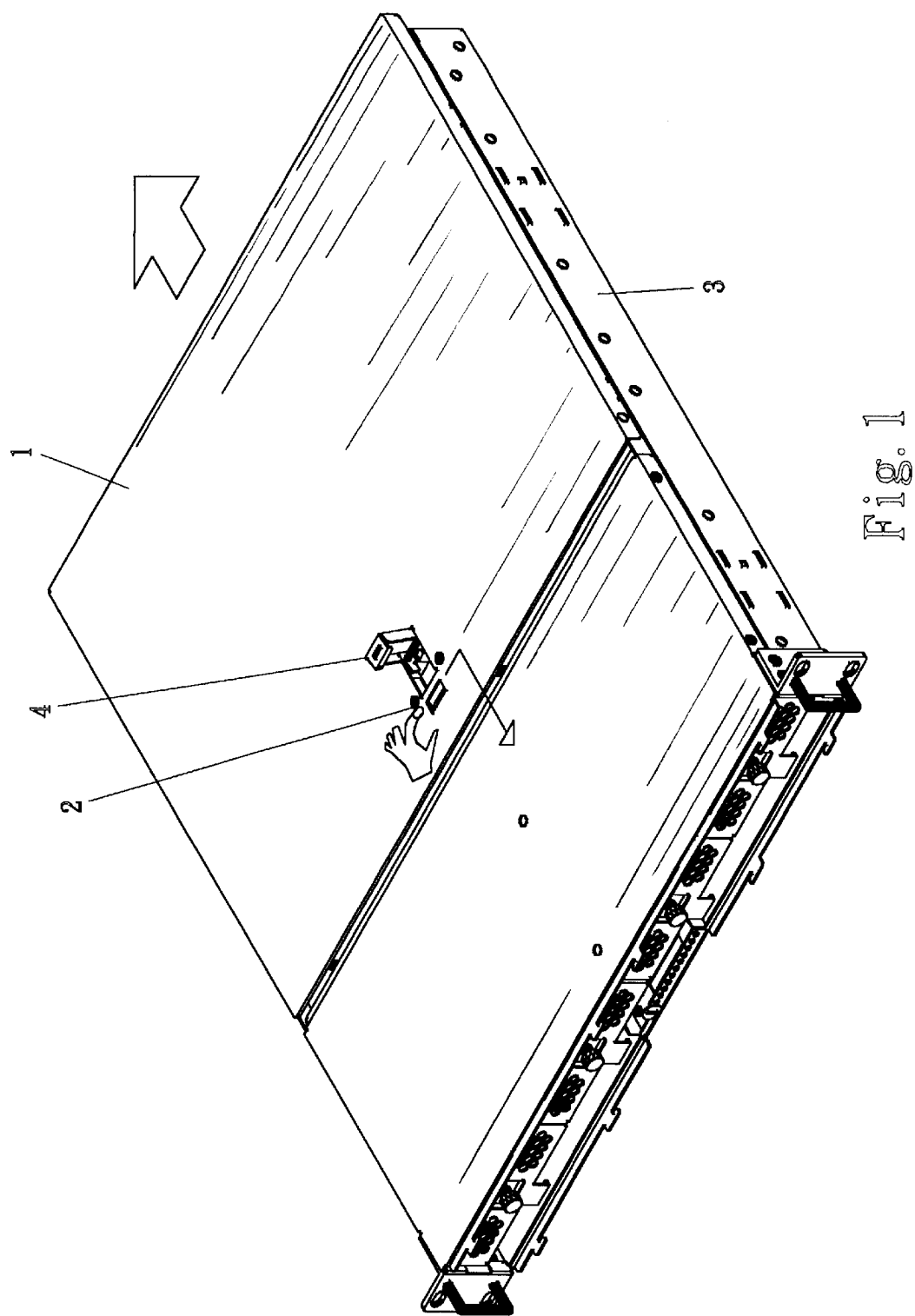
FIG. 1 is the perspective view of the embodiment of the invention.
Figure 2:
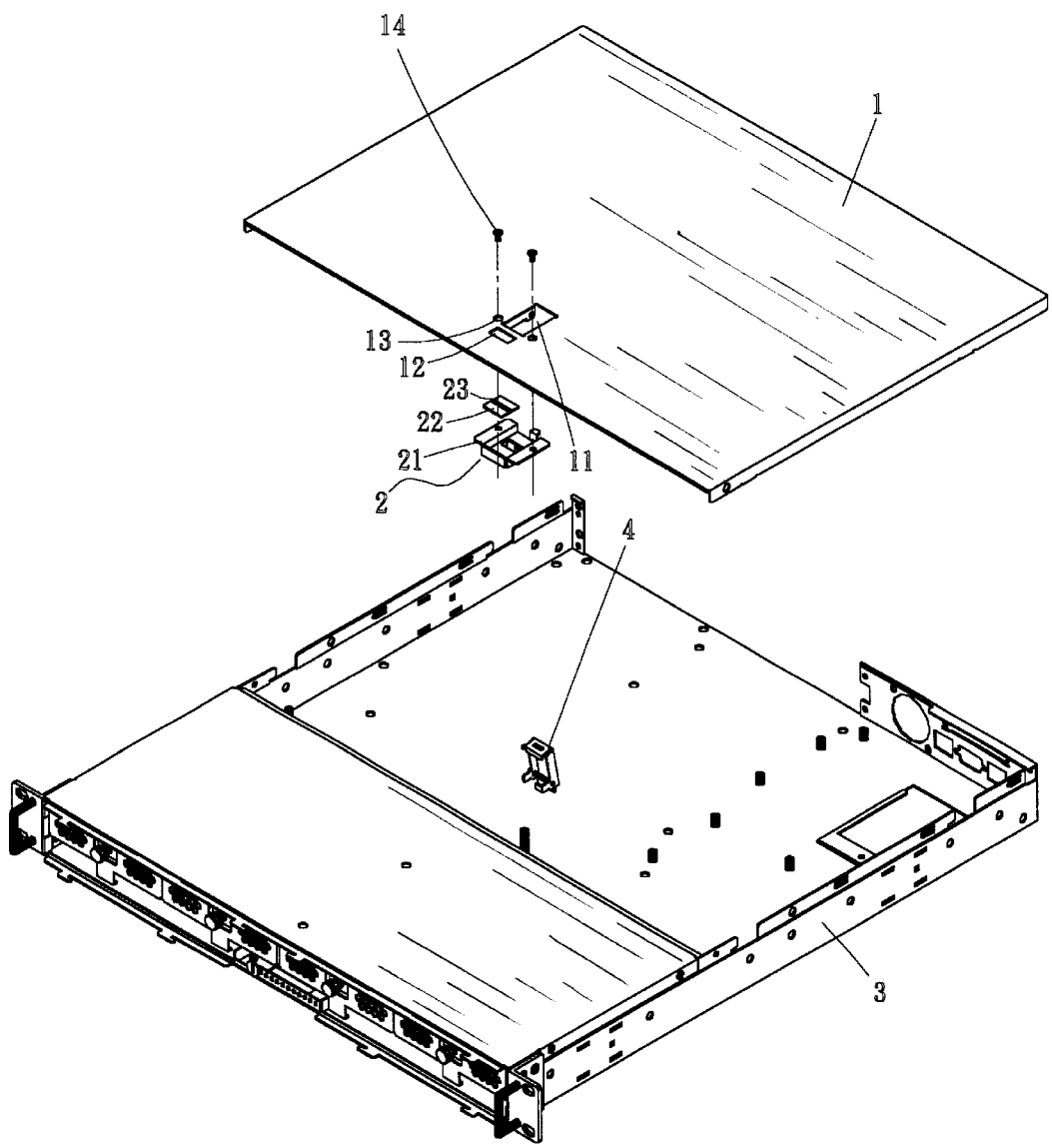
FIG. 2 is the exploded perspective view of the shell cover and lock device of the embodiment of the invention.
Figure 3:
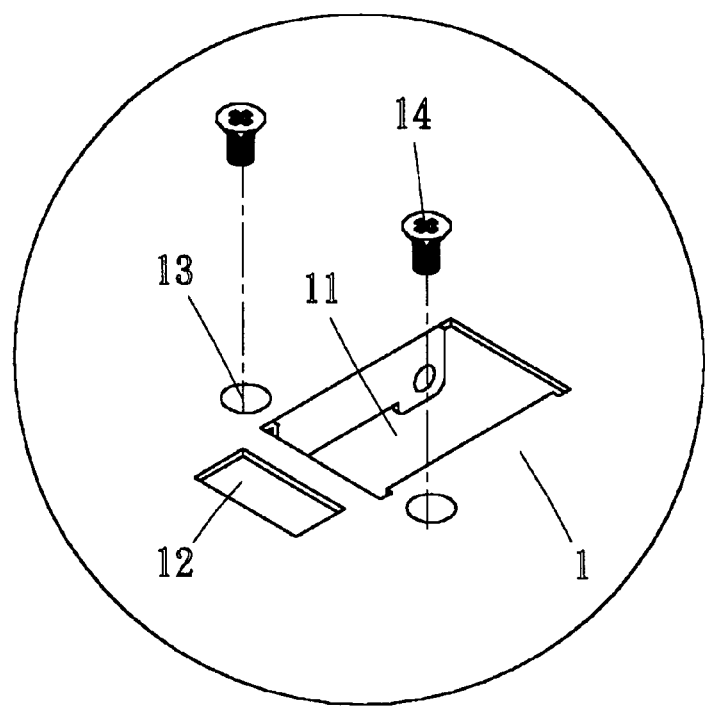
FIG. 3 is the larger and smaller tenons on the schematic perspective view of the shell cover of the invention.
Figure 4:
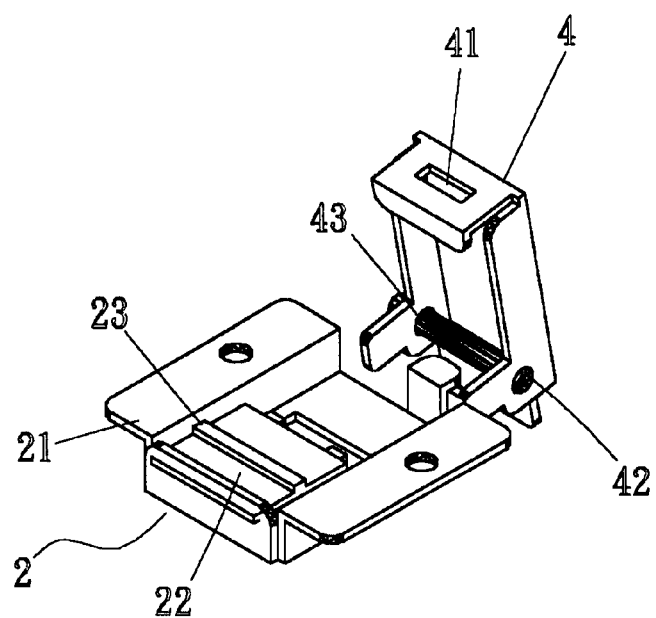
FIG. 4 is the schematic perspective view of the rotary lock member and the lock member of the invention.

As shown in FIG. 1, the invention with industrial computer as for the perspective view of the embodiment thereof, which provides a larger tenon 11 and a smaller tenon 12 on the shell cover 1, and provides a set of through-holes 13 at the front edge of both sides of the smaller tenon 12, bolted fast to the backside of the smaller tenon 12, a sliding lock unit 2 with bolts 14 on the backside of the smaller tenon 12 on shell cover 1.

The above lock unit 2 contains a tray 21 and a lock piece 22, which can move forward and backward on the tray 21, and a push plug 23 of the lock piece 22 just positioned within the smaller tenon 12, for the operator to push the lock piece 22 forward and backward through the smaller tenon 12, from outside the shell cover 1 with fingers.

And on the floor of the shell 3 wherewith corresponding to the larger tenon 11 of the shell cover 1, installed a rotary lock member 4, and provided a lock-hole 41 at the front edge of said rotary lock member 4 rendered in rotatable state with an axis 42, and provided a spring 43 on the axis 42, therewith the action to keep upright of the member.

Upon implementation, when the shell cover 1 is to be closed, with the rotary lock member 4 on the shell 3 extending through the larger tenon 11 of the shell cover 1, and after closing the shell cover 1 in position, rotate and press the rotary lock member 4 to leveled state, and push the lock piece 22 of the lock unit 2 in the smaller tenon 12, rendering the lock piece 22 locked into the lock-hole 41 of rotary lock member 4 into position; and when the shell cover 1 is to be opened, push the lock piece 22 in reverse direction, rendering the rotary lock member 4 sprung to upright state, and the shell cover 1 is released from the lock in opened state.

In summing up the above, the invention has a trimmed structure, to make the opening or lock-closed operation of the shell cover 1 simple and certained, which conforms to the essence of the new pattern of the patent. In accordance to patent laws, hereby apply for patent protection.

What is claimed is:

1. An open-close device for shell covers, which contains:
    a shell cover, on which provided a larger tenon and a smaller tenon, and on both sides of the front edge of the smaller tenon provided a set of through-holes, with bolts onto the back side of the smaller tenon bolted fast a sliding lock unit to the backside of the smaller tenon;
    a lock unit installed on the back side of the smaller tenon, which contains a tray and a lock piece that can move forward and backward in the tray, for the operator to push the lock piece forward and back ward using fingers through the smaller tenon from outside the shell cover;
    a lock member, which is provided in the shell wherein corresponding to the larger tenon of the shell cover, and at the front edge of said lock member, provided a lock-hole, which rendered with an axis in a rotatable state, and provided a spring on the axis, to render with action therewith in upright state;

the invention is characterized with: a lock member to extend through the larger tenon of the shell cover, and the rotary lock member to be rotated and pressed into leveled state, and the lock piece of the lock unit in the smaller tenon pushed to make the lock piece locking into the lock-hole of the rotary lock member, so the shell cover is locked in position, as for to open-up, reversing the steps suffices.

* * * * *